(12) United States Patent
Holl et al.

(10) Patent No.: US 8,917,386 B2
(45) Date of Patent: Dec. 23, 2014

(54) APPARATUS FOR CHECKING THE AUTHENTICITY OF VALUE DOCUMENTS

(75) Inventors: Norbert Holl, Germering (DE); Dieter Stein, Holz-kirchen (DE); Shanchuan Su, Neubiberg (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/700,297

(22) PCT Filed: May 26, 2011

(86) PCT No.: PCT/EP2011/002615
§ 371 (c)(1),
(2), (4) Date: Nov. 27, 2012

(87) PCT Pub. No.: WO2011/147575
PCT Pub. Date: Dec. 1, 2011

(65) Prior Publication Data
US 2013/0088712 A1     Apr. 11, 2013

(30) Foreign Application Priority Data

May 27, 2010 (DE) .......................... 10 2010 021 803

(51) Int. Cl.
*G01J 1/42* (2006.01)
(52) U.S. Cl.
CPC ... *G01J 1/42* (2013.01); *G07G 7/12* (2013.01); *G07G 7/2025* (2013.01)
USPC .......................................................... 356/71
(58) Field of Classification Search
CPC .................................................. G06K 9/00046
USPC .................... 356/71; 209/534; 283/72; 726/1
See application file for complete search history.

(56) References Cited

U.S. PATENT DOCUMENTS

| | | | |
|---|---|---|---|
| 6,040,584 A | 3/2000 | Liu et al. | |
| 2008/0283451 A1* | 11/2008 | Holl et al. | 209/534 |
| 2010/0128934 A1 | 5/2010 | Su et al. | |

FOREIGN PATENT DOCUMENTS

| | | |
|---|---|---|
| DE | 196 04 856 A1 | 8/1997 |
| DE | 198 20 057 A1 | 11/1999 |
| DE | 100 45 360 A1 | 3/2002 |

(Continued)

OTHER PUBLICATIONS

Search Report in German Application No. 10 2010 021 803.0, dated Feb. 23, 2011, 4 pages.

(Continued)

*Primary Examiner* — Tarifur Chowdhury
*Assistant Examiner* — MD Rahman
(74) *Attorney, Agent, or Firm* — Workman Nydegger (57) ABSTRACT

Testing the authenticity of a valuable document, whereby at least one intensity distribution of electromagnetic radiation passing through the valuable document in the dark field is detected in a spatially resolved manner and a spatially resolved dark field characteristic is determined therefrom. The actual authenticity test is then performed by a procedure in which selected test partial regions of the valuable document are assigned respectively to one of a plurality of suspicion classes, an interconnection region is formed from substantially interconnected test partial regions that were assigned to at least one specific suspicion class, and the valuable document, depending on the form and/or position of the interconnection region, is assigned to one of at least two authenticity categories which is linked to the at least one specific suspicion class.

18 Claims, 5 Drawing Sheets

(56) References Cited

FOREIGN PATENT DOCUMENTS

| DE | 10 2007 015 484 A1 | 10/2008 |
| DE | 10 2007 019 107 A1 | 10/2008 |
| DE | 10 2007 021 130 A1 | 11/2008 |
| EP | 1 818 876 A1 | 8/2007 |
| GB | 2 311 130 A | 9/1997 |
| WO | 2008/119531 A1 | 10/2008 |
| WO | 2008/149051 A1 | 12/2008 |
| WO | 2009/133332 A1 | 11/2009 |

OTHER PUBLICATIONS

International Search Report in PCT/EP2011/002615, dated Aug. 26, 2011.
International Preliminary Examination Report on Patentability and Written Opinion in PCT/EP2011/002615, dated Nov. 27, 2012.

* cited by examiner

APPARATUS FOR CHECKING THE AUTHENTICITY OF VALUE DOCUMENTS

BACKGROUND OF THE INVENTION

A. Field of the Invention

The present invention relates to a method for checking the authenticity of a value document, to a corresponding apparatus for checking the authenticity of value documents, as well as to a processing device for value documents.

B. Related Art

So-called "composed" forgeries of value documents are composed of several parts, e.g. of one or several authentic document parts and/or one or several forged document parts. For detecting such forgeries various methods are known, e.g. the evaluation of the value document's reflection in order to recognize adhesive tape or other connections of the individual document parts with the aid of reflection properties. This, however, is not possible with all adhesive tapes or adhesive connections, but only with those having reflection properties recognizably deviating from the rest of the document. There can further be used fluorescence properties of a composed forgery for the recognition, when the individual document parts are based on different (paper) substrates, or the position and/or orientation of optically recognizable features of a composed forgery serve for recognizing optical discontinuities in the prints of the forged value document. However, not all composed forgeries can be reliably recognized by these methods.

The invention is hence based on the object of stating a method by which composed forgeries can be recognized as reliably as possible.

This object is achieved by methods and apparatuses having the features of the independent claims. In claims dependent thereon there are stated advantageous embodiments and developments of the invention.

In a method for checking the authenticity of a value document, at least one intensity distribution of electromagnetic radiation passing through the value document is captured and evaluated. According to the invention, the at least one intensity distribution is captured in dark field in locally resolved fashion and a locally resolved dark field characteristic is determined therefrom, which for example may correspond to a digital intensity image of the value document in a desired spectral region.

Subsequently, suitable partial check regions of the value document are selected and from the associated details of the dark field characteristic there is respectively derived an individual characteristic intensity value which is compared with at least one upper and/or lower threshold value. Depending on these comparisons, the partial check regions are respectively assigned to one of several preset suspicion classes or are classified with regards to the suspicion classes. From those partial check regions which have been assigned to at least one certain suspicion class, for example to a suspicion class indicating a forgery, there is formed an interrelation region, by the substantially interrelated partial check regions of the relevant suspicion classes being interconnected. Substantially interrelated partial check regions here refer to partial check regions which lie sufficiently close together, even when they do not have any directly adjacent pixels in the digital intensity image of the value document.

Finally, depending on the form of the interrelation region and/or its location within the value document, the value document is assigned to one of at least two preset authenticity categories which is linked with that at least one certain suspicion class to which the partial check regions forming the interrelation region have been assigned.

An apparatus for checking the authenticity of value documents according to the invention accordingly comprises a capture device and an evaluation device for capturing and evaluating electromagnetic radiation passing through the value document. The capture device here comprises a dark field transmission measuring device with which at least one intensity distribution of the electromagnetic radiation passing through the value document to be checked is captured in dark field in locally resolved fashion. The evaluation device then forms the locally resolved dark field characteristic of the value document from the captured intensity distribution and assigns selected partial check regions of the value document to respectively one of several preset suspicion classes by means of the above-described threshold value comparison, forms an interrelation region from the substantially interrelated partial check regions, and finally assigns the value document to an authenticity category, depending on the form and/or location of the interrelation region.

A processing device for value documents, in which an apparatus for checking the authenticity according to the invention is integrated, is preferably also configured, besides to check the authenticity, to process value documents to the effect that the value documents are sorted according to the type of value document and/or are checked for their fitness for circulation.

Preferably, those partial check regions are aggregated to an interrelation region, which have been assigned to a suspicion class indicating a forgery of the value document. With the aid of this interrelation region, the value document is assigned to an authenticity category relating to forged value documents, if the interrelation region has a form typical of forged value documents and/or a location within the value document typical of forged value documents.

The recognition of the forged bank notes is thus based on a two-step recognition method which in a first step ascertains suspicious partial check regions of the value document and in a second step checks whether an interrelation region formed from the suspicious partial check regions, due to its form and/or location, suggests a forgery.

In the dark field transmission measurement according to the invention the radiation intensity of the radiation passing through the value document to be checked is measured, wherein, however, the proportion of the radiation which passes through the value document substantially in a straight line does not contribute or contributes only to a negligible extent to the measurement result of the dark field transmission measurement. Rather, substantially only the radiation strongly deflected in its propagation direction contributes to the measurement result of the dark field transmission. For this reason, in a dark field transmission measurement also partial regions and primarily separating lines of a composed forgery cause particularly striking measurement results, which e.g. would not be recognizable by means of a bright field transmission measurement, in which there is measured primarily radiation passing through the value document in a straight line or at least substantially in a straight line.

In comparison to bright field transmission measurement, the use of dark field transmission measurement is of great advantage, because the dark field transmission measurement yields particularly informative digital intensity images as a basis for the further method. Here, in particular on the separating lines between two document parts provided e.g. with an adhesive, or on the adhesive tapes or other adhesive connections applied thereon there can be recognized an intensity course of scattered (i.e. measured in dark field) radiation, which significantly differs from that within the document parts of a composed forgery. The (scattered) radiation measured in dark field here takes a different intensity course than in bright field, because the ratio between straight-line transmission and scattering in the case of an adhesive or adhesive tape normally is completely different than in the document parts themselves.

It is a substantial advantage of the invention, that with the form and/or location of the interrelation region there is taken into account a morphologic criterion upon the evaluation of the dark field characteristic, which allows a global judgment of the relevant value document. The clear intensity variations at the separating lines measured upon the dark field transmission here enable particularly reliable and stable results of the described recognition method.

The selected partial check regions of the value document can be e.g. partial regions of the value document, which consist of individual pixels, groups of pixels or larger-area grid regions of the dark field characteristic. Upon assigning the selected partial check regions of the value document to one or several suspicion classes, a characteristic intensity value of the dark field characteristic of the respective partial check region is compared with the upper and/or lower threshold value. Here, the characteristic intensity value of the relevant dark field characteristic can be for example an average value or median value of the individual intensity values. If the dark field characteristic comprises only one pixel, the intensity value thereof can be used as a characteristic intensity value of the dark field characteristic. The comparison of the characteristic intensity value with the threshold value is preferably a greater/smaller comparison. Here, the suspicion classes can relate to graded probabilities for the existence of a forgery, e.g. "most probably forged", "likely forged", "unknown", "likely authentic", "most probably authentic", or the like.

For forming the interrelation regions, criteria are preset with respect to those suspicion classes of which partial check regions enter into the interrelation region and when these are considered substantially interrelated. For example, the interrelation region can be formed from neighboring partial check regions of the suspicion classes "most probably forged" and "likely forged".

The concept of electromagnetic radiation comprises in this case the entire electromagnetic spectrum, but in particular light in the visible spectral region or radiation in the infrared region or in the ultraviolet region. Accordingly, the intensity distribution of the value document to be checked is captured preferably in the infrared region, in the visible spectral region or in the ultraviolet region, any arbitrary combinations of these three or other selected spectral regions also being possible. For example, particularly good recognition results can be achieved with a capturing of intensity distributions in the infrared region and/or in the green visible spectral region. Here, the strength of the scattering of the electromagnetic radiation caused by the material of an adhesive, adhesive tape or another adhesive connection depends on the wavelength of said electromagnetic radiation. Normally, there is an optimal spectral region which yields particularly clear results with the separating lines of a composed forgery by means of dark field transmission measurement. This optimal spectral region can be determined experimentally or by means of numerical simulation calculations.

In accordance with a preferred embodiment, in several spectral regions respectively one intensity distribution is captured and the locally resolved dark field characteristic is determined from the captured intensity distributions, by values of the intensity distributions of different spectral regions locally corresponding to each other being linked with each other. Here, in particular a weighted, location-dependent linkage has proved to be advantageous, i.e. a linkage wherein the intensity values of different spectral regions are provided with weighting factors and suitably linked with each other, e.g. additively or multiplicatively. Other linkages, such as e.g. subtractive or divisive linkages, may be suitable as well, depending on the respective composed forgery and the selected spectral regions. It has turned out that for the secure recognition of separating lines it is particularly advantageous to capture respectively one intensity distribution in the infrared region and one in the green visible spectral region, in order to determine therefrom the locally resolved dark field characteristic by locally averaging (possibly in weighted fashion) the two intensity distributions. In the simplest case, however, the dark field characteristic is equal to the intensity distribution captured in locally resolved fashion of the electromagnetic radiation of one single spectral region.

The selected partial check regions of the value document can be assigned to a suspicion class in dependence on local and/or global threshold values. There can therefore also be used threshold values which are valid only for certain local regions of the value document to be checked, e.g. only for the selected partial check regions themselves. Local threshold values are preferably used when the dark field transmission of an unforged value document takes locally strongly varying intensity values (e.g. due to security elements, prints, or the like).

Preferably, the threshold values are specified depending on one or several partial reference regions of the value document or are derived from these. Alternatively or additionally, the threshold values can also be derived from preset standard threshold values, which have been determined e.g. with the aid of a multiplicity of unforged standard value documents.

The partial reference regions from which local or global threshold values are derived, can be any arbitrary partial regions of the value document to be checked, which comprise, as secure as possible, no proportions of a separating line, so that suitable threshold values can be ascertained, against which the intensity values of a separating line are strikingly above- or below-threshold. In particular, the partial reference regions can be, analogous to the above-described partial check regions, individual pixels, a group of neighboring pixels or larger-area grid regions of the dark field characteristic. Preferably, the partial reference regions, from which local threshold values are derived, and the partial check regions, which are checked with the aid of the local threshold values, are only slightly spaced apart.

For specifying the threshold values, preferably characteristic intensity values of the dark field characteristics of different partial reference regions of the value document are arithmetically linked with each other. The characteristic intensity values of the dark field characteristics of the partial reference regions can be determined here analogous to the characteristic intensity values of the partial check regions. These characteristic values of the different partial reference regions can then be arithmetically linked (e.g. as an average value, median, or the like), so as to derive therefrom the necessary threshold values.

According to a further embodiment, threshold values are specified by standard threshold values of a standard value document being corrected or adjusted. In so doing, for forming a threshold value applicable to the present value document, a standard threshold value is corrected upward, if a characteristic intensity value derived from the dark field characteristics of different partial reference regions lies above a standard intensity of the standard value document. Accordingly, a standard threshold value is corrected downward, if the characteristic intensity value derived from the dark field characteristics of different partial reference regions lies below a standard intensity of the standard value document. This makes it possible for the standard threshold values to be adjusted to the actual dark field transmission of a value document, which may strongly depend in particular on its state of use.

At least one of the suspicion classes is a suspicion class indicating a forgery of the value document. Accordingly, partial check regions, whose characteristic intensity value lies above an upper threshold value or below a lower threshold value, are assigned to this suspicion class. From these partial check regions, finally, the interrelation region is formed.

The threshold values here are preferably selected such that in partial check regions located in the region of a separating line the characteristic intensity value of the relevant dark field characteristic lies above the previously mentioned upper threshold value or below the previously mentioned lower threshold value, on the one hand, and that in partial check regions located in the region of the partial documents or their substrates the characteristic intensity value of the relevant dark field characteristic lies between the upper and lower threshold value, on the other hand. The partial check regions mentioned first are then assigned to a suspicion class which indicates a forgery, while those mentioned last are assigned to a suspicion class which indicates an unforged, authentic value document. If there exist suspicion classes further graded with respect to the forgery probability, corresponding further threshold values are necessary so as to define these suspicion classes.

In a preferred embodiment, at least one partial check region at a margin of the value document or at a margin of a (previously detected or known) security element of the value document is selected, which has been previously assigned to a suspicion class indicating a forgery. Then, starting out from this partial check region, further partial check regions substantially interrelated with this are ascertained, which likewise are to be assigned to a suspicion class indicating a forgery. Finally, all the partial check regions ascertained in this way are aggregated to an interrelation region, in order to assign the value document to an authenticity category, depending on form and/or location of the interrelation region.

In this embodiment there is made use of the fact that composed forgeries have typical separating lines between two margin regions of the value document or enclose a security element. For the recognition thereof, the described step-by-step procedure is advantageous insofar as first not all or at least not very much partial check regions must be assigned to a suspicion class, but, starting out from a partial check region indicating a forgery at the margin of the document, only partial check regions interrelated with this are checked. In this way, a separating line extending from margin to margin or enclosing a security element can be reconstructed step by step.

Accordingly, in this embodiment upon the evaluation of the form and/or of the location of the interrelation region ascertained step by step it is checked whether this interrelation region extends from one side of the value document to the same side or to a different side or encloses a security element. A value document having such an interrelation region is then assigned to the authenticity category "forgery". Here, besides the form and/or the location of the interrelation region, additionally the number of those partial check regions can be taken into account, which have been assigned to a suspicion class indicating a forgery.

Preferably, several suspicion classes indicating a forgery are preset, e.g. graded according to forgery probabilities of the partial check regions. The classification of the value document into an authenticity category can then be effected such that partial check regions which have been assigned to a suspicion class that with high probability indicates a forgery particularly strongly influence this classification.

DESCRIPTION OF THE DRAWINGS

Further features and advantages of the invention will result from the following description of the embodiment examples of the invention as well as further alternative embodiments in connection with the drawings, which show:

FIG. 2b the intensity profile of a dark field transmission along a line through the composed forgery of FIG. 2a;

DETAILED DESCRIPTION

The embodiment examples of the invention described in the following relate to the recognition of composed forgeries of bank notes, i.e. the assignment of a bank note composed of authentic and/or forged bank note parts to an authenticity category "forgery" or "composed forgery". Besides for bank notes, the method of course can be used for any other value documents, e.g. identity cards, official documents, shares, bonds, or the like.

Figure 1:
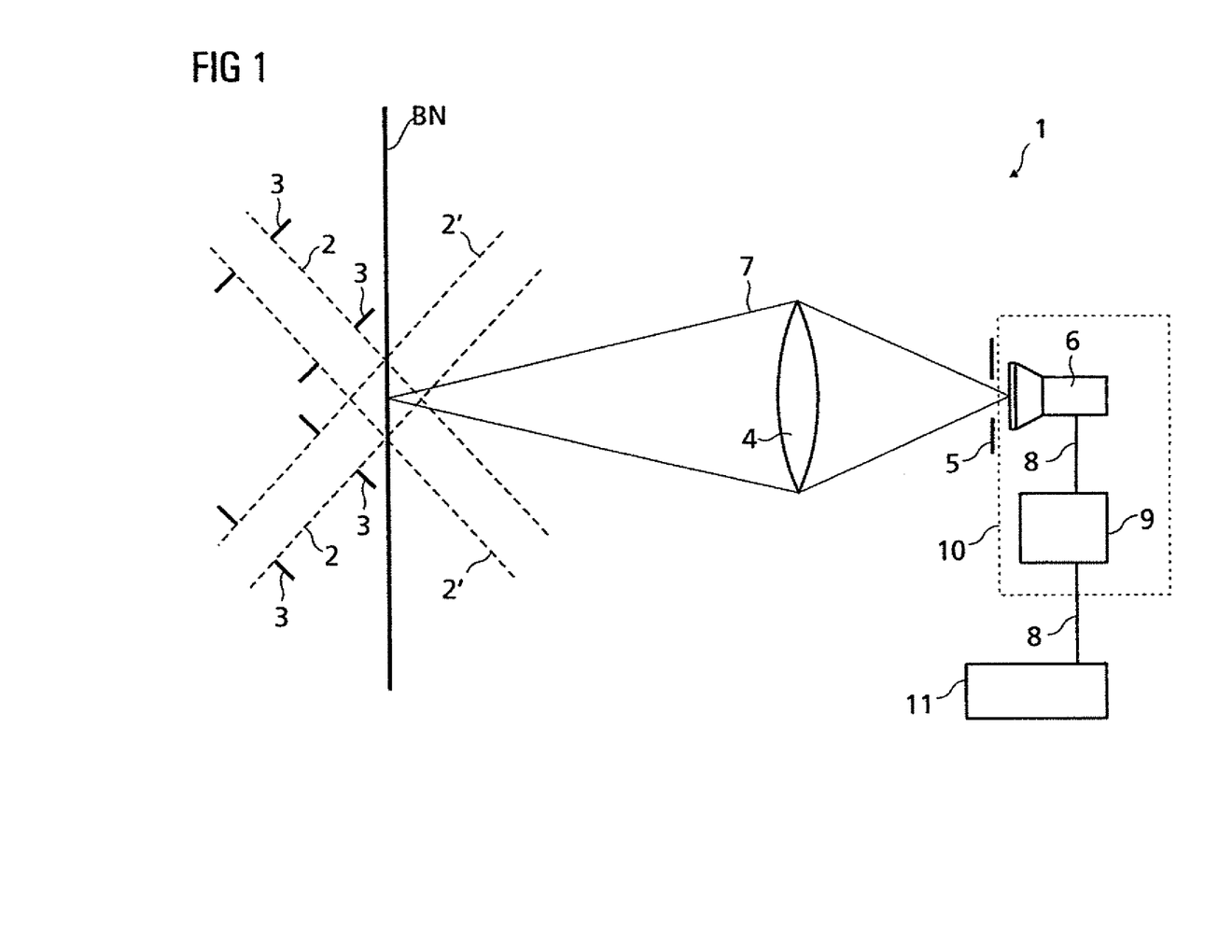
FIG. 1 an apparatus for checking the authenticity of bank notes.

FIG. 1 shows schematically an apparatus 1 for checking the authenticity of bank notes BN. In so doing, electromagnetic radiation 2 collimated in parallel by diaphragms 3 impinges on the bank note BN. The electromagnetic radiation 7 passing through the bank note BN in a direction different from the direction of the incident electromagnetic radiation 2 is measured in dark field in locally resolved fashion by means of a suitable imaging optic 4, 5, which in this case comprises a lens 4 and a diaphragm 5, and a dark field transmission measuring device 6. The dark field transmission measuring device 6 can be for example any arbitrary suitable detector, e.g. a camera, a line camera, a CCD sensor, or the like.

The incident electromagnetic radiation 2 is in particular white or colored light in the visible spectral region, UV radiation in the ultraviolet spectral region or IR radiation in the infrared spectral region or combinations of these or other spectral regions.

In accordance with FIG. 1, the incident electromagnetic radiation 2 impinges on the bank note BN obliquely to the normal to the bank note surface and is detected as a radiation 7 passing through in the direction of this normal, i.e. with a suitable angular deviation compared to that angle with which the electromagnetic radiation 2 impinges on the bank note BN. Likewise, the electromagnetic radiation 2 can impinge in normal direction (i.e. perpendicular) on the bank note BN and the radiation 7 passing through can be detected in a direction different from the normal (i.e. obliquely to the bank note BN).

It is also possible that the electromagnetic radiation 2 impinges on the bank note BN obliquely to the normal and the radiation 7 passing through is detected in a direction which is different from the normal and from the angle in which the electromagnetic radiation 2 impinges on the bank note BN. All these variants in the present case are understood to be "dark field transmission measurement".

The dark field transmission measuring device 6 captures radiation 7 passing through the bank note BN at an angle which is sufficiently different from that angle with which the radiation 2' passes through the bank note BN substantially in a straight line. In principle, it is sufficient for a dark field transmission measurement in accordance with the present invention, however, when a still captured proportion of the radiation 2' extending in a straight line is so strongly attenuated that compared with the captured scattered radiation 7 it contributes only negligibly to the measurement result.

The dark field transmission measuring device 6 is connected through a data line 8 with a measuring device 9 and together with this forms a capture device 10, which captures in dark field in locally resolved fashion the electromagnetic radiation 7 passing through the bank note BN, i.e. as a grid or pixel-based digital image. Via the measuring device 9 the capture device 10 is connected via a further data line 8 with an evaluation device 11, e.g. with a personal computer having a suitable evaluation software, which evaluates the captured radiation 7, and finally assigns the bank note BN to one of at least two preset authenticity categories (e.g. "authentic" or "forged/suspicious").

The authenticity check apparatus 1 in turn can be component of a bank note processing device (not shown) which performs any arbitrary further processing of the checked bank note BN. By this device the bank notes BN can be e.g. counted, stacked, sorted according to any arbitrary criteria or checked as to fitness for circulation. The bank note processing device which has the authenticity check apparatus 1 of the invention can be a bank note processing device which outputs the bank notes after their processing. The invention also comprises, however, a bank note processing device having the authenticity check apparatus 1 of the invention, which can accept and store bank notes BN to be deposited and/or can output bank notes BN to be dispensed.

Figure 2A:
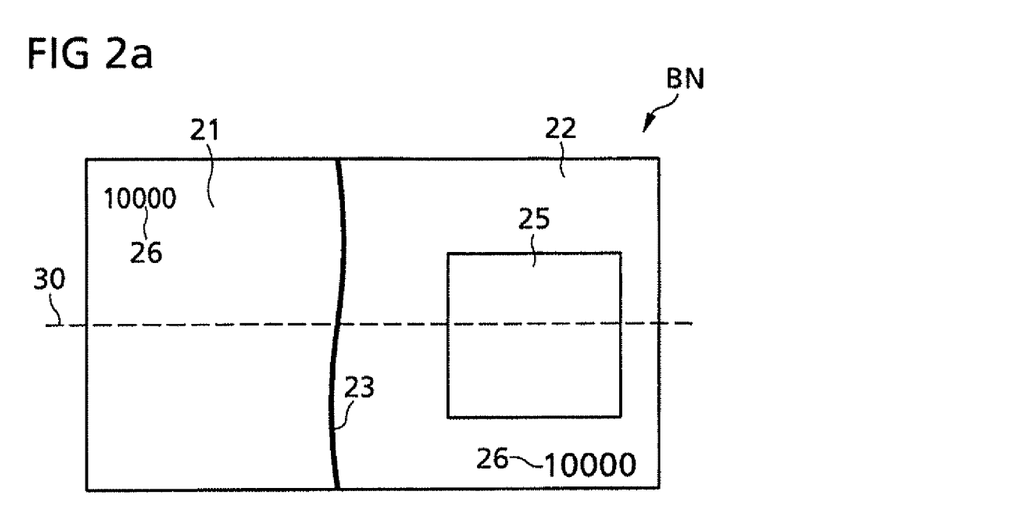
FIG. 2a an example of a composed forgery of a bank note.

FIG. 2*a* shows a composed forgery of a bank note BN, which consists of a forged bank note part 21 and an authentic bank note part 22. The bank note parts 21, 22 are connected with an adhesive in the region of the separating line 23 between the bank note parts 21, 22. The adhesive e.g. can be applied in liquid form and then cured and is normally transparent. In principle, composed bank notes BN can be composed in any arbitrary fashion of forged bank note parts 21 and/or authentic bank note parts 22. In particular, composed bank notes BN can also be composed of more than two bank note parts. The composed bank note BN of FIG. 2*a* is provided with an indication of denomination 26 as well as with a security feature 25. Further security features, such as e.g. watermarks, security threads, or the like, can be additionally present.

Figure 2B:
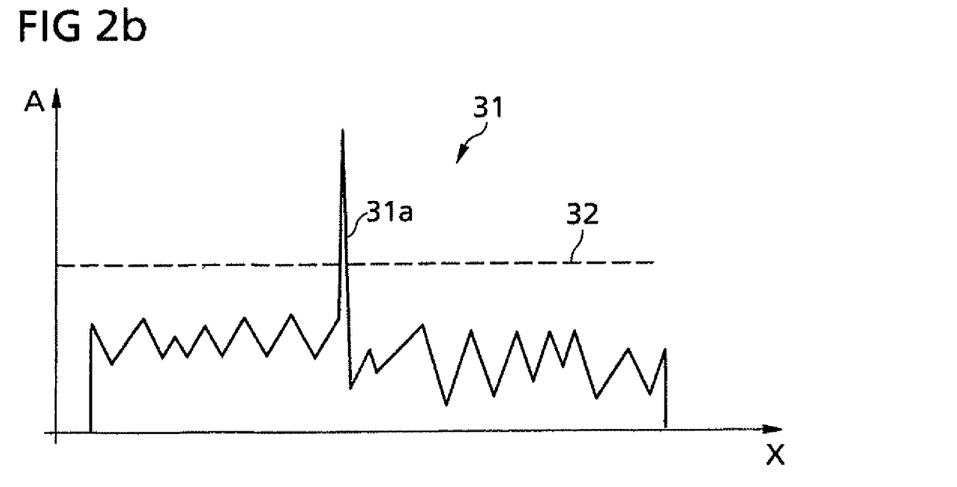

FIG. 2*b* shows the profile course 31 of the intensity A of the dark field transmission through the composed bank note BN of FIG. 2*a* along the dashed line 30. In the region of the separating line 23 provided with an adhesive a clear intensity maximum 31*a* is recognizable, which can be distinguished from other e.g. noise-based intensity variations of the dark field transmission with the aid of a threshold value 32. The maximum 31*a* is due to the fact that the adhesive along the separating line 23 scatters the incident electromagnetic radiation 2 significantly stronger than the (paper) substrate of which the bank note parts 21, 22 consist. This effect is particularly well recognizable in dark field, e.g. with the variants of composed forgeries sketched by way of example in FIG. 3. In the FIGS. 3*a* to 3*c* the bank note parts 21, 22 of the composed bank note BN are adhesively bonded with an adhesive, whereas in the FIGS. 3*d* to 3*f* in the region of the separating line 23 an adhesive tape 24 is applied, which connects the bank note parts 21, 22.

Figure 3A:
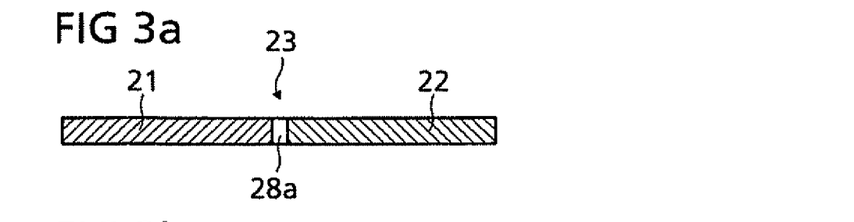
FIGS. 3a to 3f exemplary cross-sections through composed forgeries which show typical forms of separating lines between the document parts of composed forgeries.
Figure 3B:
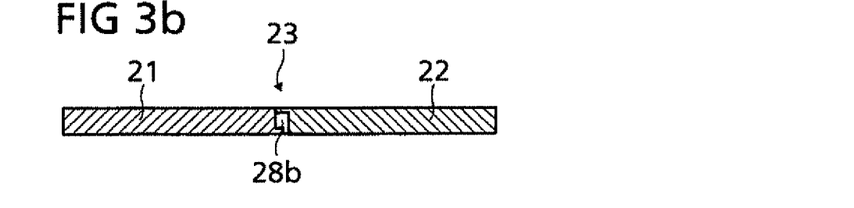
Figure 3C:
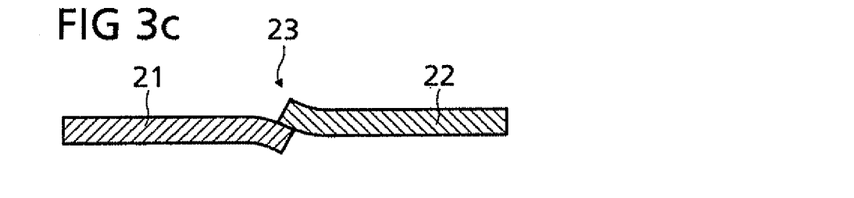

As a result of adhesively bonding a composed bank note BN by means of an adhesive, in the region 28*a* an adhesive-filled gap may arise between the bank note parts 21, 22 (FIG. 3*a*). If the edges of the bank note parts 21, 22 contact each other (FIG. 3*b*), an adhesive-filled bonding region 28*b* is still present which is due to the normally uneven course of these edges. Both in the structure represented in FIG. 3*a* and in the one shown in FIG. 3*b* the bonding regions 28*a*, 28*b* may not be recognizable in a bright field transmission image. This is the case, when the intensity measured with a bright field transmission measurement does not change significantly in the bonding regions 28*a*, 28*b*. Since, however, in an adhesive the ratio between scattering and absorption is completely different than in a homogeneous bank note paper, the separating lines 23 are regularly well recognizable with the aid of the significantly changing scattering in the regions 28*a*, 28*b* by means of a dark field transmission measurement.

Figure 3D:
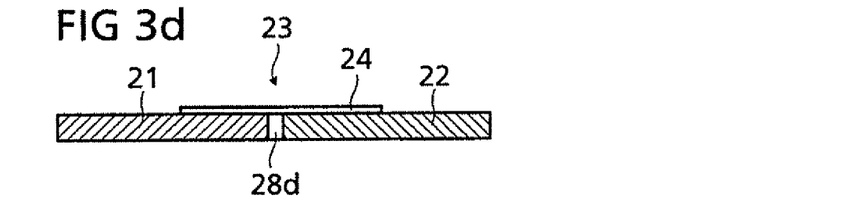
Figure 3E:
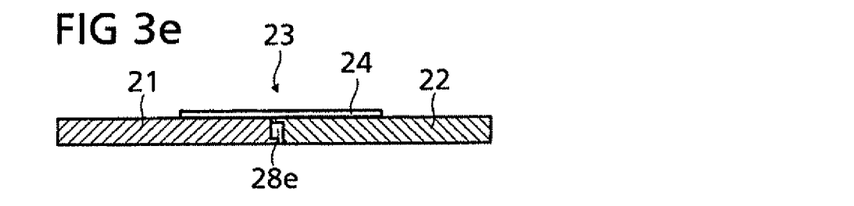
Figure 3F:
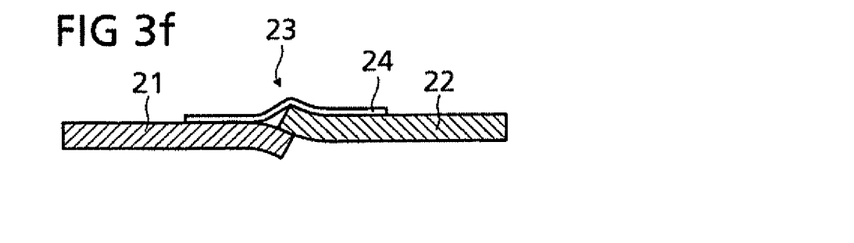

Analogous to this, upon adhesively bonding with an adhesive tape or band 24 (e.g. with a transparent adhesive tape), as represented in FIGS. 3*d* and 3*e*, between the bank note parts 21, 22 there may be formed gap regions 28*d*, 28*e*, which can be recognized, possibly even together with the adhesive band 24, with the aid of the significant scattering by means of a dark field transmission measurement. In the composed bank notes BN shown in cross-section in FIGS. 3*c* and 3*f* the bank note parts 21, 22 overlap each other. These overlapping regions, too, are well recognized with the aid of the significant scattering by means of a dark field transmission measurement. In addition, also an adhesive tape 24 protruding beyond the margin of the composed bank note BN is detected with the aid of a significantly higher scattering by means of a dark field transmission measurement.

In all the examples represented above the exact course of the dark field transmission in the region of the separating line 23 or of the adhesive tape 24 is dependent on various factors, in particular on the frequency range of the irradiated electromagnetic radiation 2, on the material of the employed adhesive or adhesive tape 24 as well as on the material (e.g. bank note paper) of the bank note parts 21, 22. With separating lines 23 according to the variants represented in FIGS. 3*a*, 3*b*, 3*d*, 3*e* there is regularly found an increased dark field transmission, compared with the bank note parts 21, 22. Of course, in the region of the separating lines 23 of FIGS. 3*a*, 3*b*, 3*d*, 3*e* also a comparatively reduced dark field transmission may occur, e.g. with unusual bank note materials, such as e.g. plastic substrates, or the like. Accordingly, in the overlapping regions of the separating lines 23 of FIGS. 3*c* and 3*f* there is normally found a reduced dark field transmission. In any case, the dark field transmission's intensity course to be expected can be determined experimentally or by means of simulation calculations.

Figure 4:
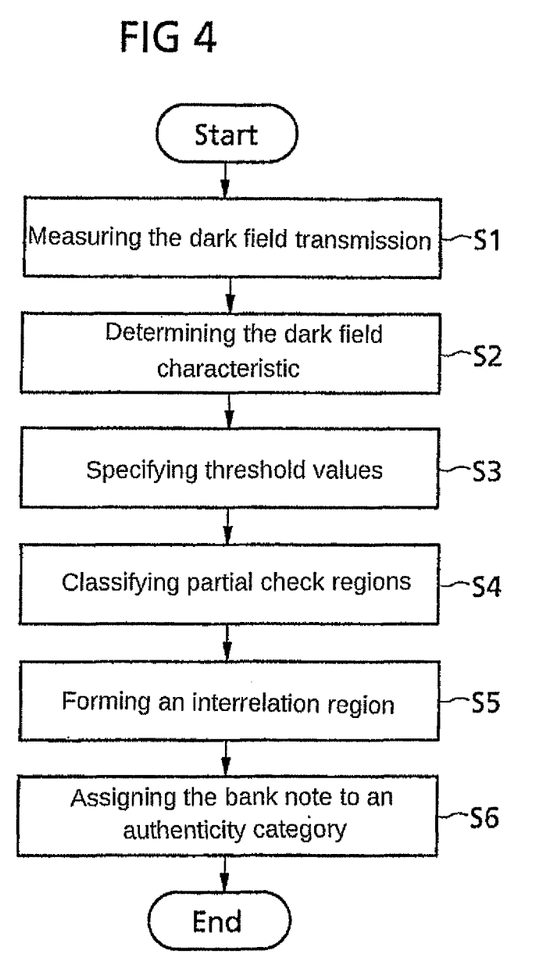
FIG. 4 a flow chart of a method for detecting composed forgeries.

FIG. 4 shows schematically the steps of a method for recognizing composed bank notes BN, which is explained in the following in connection with FIG. 5 to 7.

In the method in accordance with FIG. 4, in a first method step S1, with the capture device 10 previously described in connection with FIG. 1 the dark field transmission of a bank note BN is captured in locally resolved fashion. In so doing, for different spectral regions intensity values A of the dark field transmission are ascertained in locally resolved fashion, i.e. in locally gridded or locally scanned fashion. Then, the captured dark field transmission is evaluated in the method steps S2 to S6 by means of the evaluation device 11. In the method step S2, the intensity values A of the dark field transmission captured in locally resolved fashion for at least two different spectral regions (e.g. for the spectral regions "green" and "infrared") are linked with each other point-by-point in location-dependent fashion (e.g. added or multiplied), in order to determine a locally resolved dark field characteristic C of the bank note BN. Of course, it is possible to capture in locally resolved fashion the intensity values A of the dark field transmission for only one spectral region and to use them as a dark field characteristic C, so that the linking of the intensity values A captured in locally resolved fashion for different spectral regions in step S2 would be omitted. Alternatively or additionally, for determining the dark field characteristic C, the intensity values A of the dark field transmission can also be linked with values, likewise captured in locally resolved fashion, of a bright field transmission, of a reflection or of another measured quantity. In this context, it is also conceivable to use complementary ultrasonic transmission measurements, to permit particularly good detection of for example adhesive tape 24 in the region of a security thread. Additionally, it is conceivable to detect fluorescent light, emitted under UV illumination, by means of a fluorescence sensor.

Since significant bank-note-dependent variations of the average dark field characteristic are observed, the dark field characteristic C of the bank note BN strongly depends on the state of use thereof, e.g. on fading and abrasion. Therefore, the threshold values are specified individually for each bank note BN to be checked, with the aid of suitable partial reference regions of the relevant bank note BN. In this respect, in the subsequent method step S3, within the bank note BN there are determined several suitable partial reference regions and based on their respective details of the dark field characteristic C of the bank note BN several upper and/or lower threshold values are determined. A partial reference region here can consist of one or several pixels, e.g. of an interrelated group of pixels of the digital image of the bank note BN, for instance of a local region, a column, or the like.

The upper and lower threshold values here can be based on the local dark field characteristics C of different partial reference regions, e.g. by applying order operators (e.g. minimum, maximum, median) or distribution moments (e.g. average value, standard deviation) to previously ascertained characteristic intensity values of the local dark field characteristics C of different partial reference regions. The characteristic intensity value of a local dark field characteristic C can be e.g. the intensity value of the corresponding individual pixel or also an average value, median, or the like, of several pixels of the relevant partial reference region.

Alternatively or additionally to the determination of the threshold values on the basis of the locally resolved dark field characteristic C of the bank note BN, also the type of the bank note BN can be used for calculating the threshold value. In the simplest case, standard threshold values preset for this type from the type of the bank note BN can be taken into account. For example, such standard threshold values can be adjusted individually for each bank note, e.g. based on the difference between characteristic intensity values (e.g. the mean intensity) of the dark field characteristic C of the bank note to be checked and a standard bank note. The standard threshold values can then be suitably corrected upward or downward depending on this comparison, in order to determine the threshold values respectively valid for the bank note BN to be checked. In this way, based on suitable partial reference regions of the bank note to be checked and of the standard bank note for the bank note to be checked, globally or locally valid threshold values can be determined from local standard threshold values.

Figure 5:
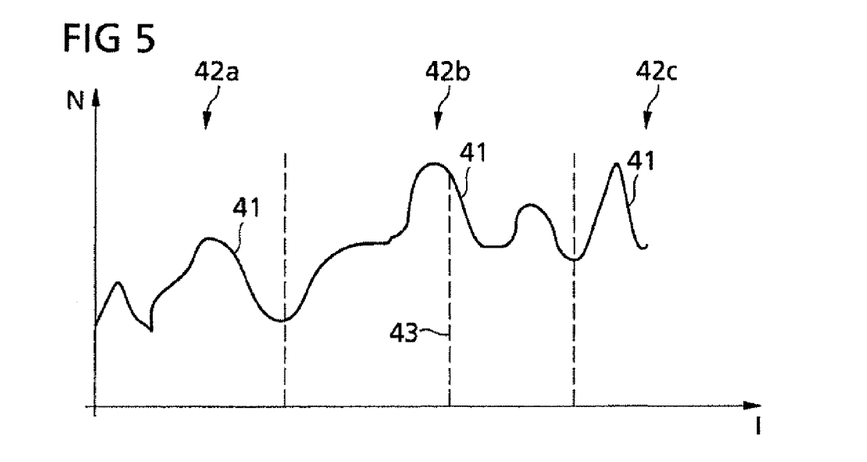
FIG. 5 a histogram for determining threshold values.
Figure 6A:
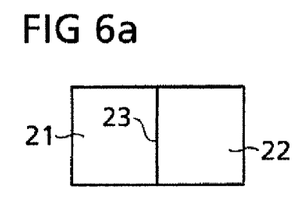
FIGS. 6a to 6c exemplary courses of separating lines of composed forgeries.
Figure 6B:
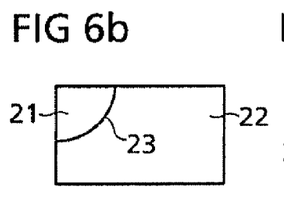
Figure 6C:
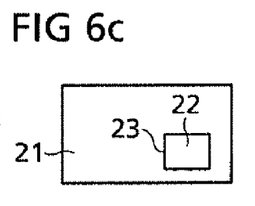

For example, with the aid of the histogram analysis illustrated in FIG. 5, threshold values for preset partial reference regions can be determined. In the histogram of FIG. 5, the occurrence frequency N of the different characteristic intensity values I of the dark field characteristics C of preset partial reference regions is plotted. Here, the partial reference regions respectively comprise only one pixel of the dark field characteristic C of the bank note BN, so that the characteristic intensity value I of the partial reference regions corresponds exactly to the intensity value of the respective pixel.

For the evaluation of the histogram, first the type of the bank note BN is determined, which provides information about different print regions of the bank note BN with different intensity distributions, e.g. die-stamping regions, bright-print regions or white-field regions. The pixels of these print regions are then selected as the partial reference regions and serve for determining the threshold values valid locally for the relevant print region. The partial check regions, to which these threshold values are applied, here thus correspond exactly to the partial reference regions on the basis of which the threshold values were calculated.

The respective print regions have assigned thereto the histogram details 42a, 42b, 42c, which describe the intensity distributions to be expected in each case. E.g. the black to dark histogram region 42a is assigned to the die-stamping regions of the bank note and the histogram regions 42b and 42c to the accordingly brighter bright-print and white-field regions. For this assignment, besides the individual print regions' concrete intensity distribution, which is based on the determined bank note type, also the area proportion (i.e. the number of pixels) of the relevant print region in (the total number of pixels of) the bank note BN can be used.

For each of the histogram regions 42a, 42b, 42c then local threshold values are determined, which are valid exactly for the relevant print region of the bank note BN. In the present case, for example for the bright-print region of the bank note BN there is determined, based on the assigned histogram region 42b, the median value 43 as the characteristic intensity value. An intensity value of a partial check region in a bright-print region of the bank note BN, which deviates from this characteristic intensity value substantially upward or downward (i.e. lies below a lower threshold or above an upper threshold), can be interpreted as a forgery indication, which is why the relevant partial check region (or the pixel) is to be assigned to a corresponding suspicion class.

In the method step S4, for the further evaluation of the electromagnetic radiation 7 captured in step 1, partial check regions 51a, 51b (cf. e.g. FIG. 7) are then assigned, based on their respective dark field characteristic C and the previously, in method step S3, specified locally valid upper and lower threshold values, to respectively one of several suspicion classes. With the aid of the suspicion classes it is distinguished, whether a characteristic intensity value of the respective partial check region 51a, 51b lies within a range that indicates the authenticity of the bank note BN, or whether it lies above a first (locally valid) upper threshold value that upwardly demarcates the authenticity region, lies above further (locally valid) upper threshold values that represent particularly strong deviations from the authenticity range, or whether a characteristic intensity value of the partial check region 51a, 51b lies below corresponding (locally valid) lower threshold values. The thus defined suspicion classes therefore describe the strength with which the dark field characteristic C of the respective partial check region 51a, 51b indicates a forgery. The characteristic intensity value of the dark field characteristic C, here too, can be e.g. the intensity value of the corresponding individual pixel or also an average value, median, or the like, of several pixels of the partial check region 51a, 51b.

In step S4, in principle all possible partial check regions 51a, 51b or pixels can be assigned to a suspicion class, in order to subsequently form from these partial check regions the interrelation region for the form- or location-based evaluation. For reasons of efficiency, however, there can also be carried out suitable preliminary checks, by e.g. an intensity maximum of all pixels of each column or line of the dark field characteristic C being determined and then only the pixels of those columns or lines being individually assigned to a suspicion class, whose intensity maximum exceeds a preset threshold value, because only there indications of a forgery are to be expected. If a column/line thus exceeds a preset threshold value, the intensity values of the pixels of this column/line are individually compared with suitable local or global threshold values and then assigned to an appropriate suspicion class. If a column/line does not exceed the preset maximum threshold value, all pixels of the column/line are assigned to a suspicion class which indicates an unforged bank note.

In the subsequent method step S5, substantially interrelated partial check regions 51b, which have been previously assigned to suspicion classes indicating a forgery, are aggregated to an interrelation region. In the simplest case, when all partial check regions (pixel) 51a, 51b of the relevant bank note BN have been assigned to a suspicion class, interrelation regions are formed from substantially interrelated partial check regions (pixels) 51b, which e.g. all have been assigned to suspicion classes indicating a forgery. In step S6 it is then decided, with the aid of the form and/or location of such interrelation regions, to which authenticity category the bank note BN is to be assigned. This evaluation can also be carried out separately for several spectral regions, whereby the separate final results, i.e. the ascertained assignments of the bank note BN to an authenticity category, must be suitably linked.

The criteria as to from which partial check regions linked with what suspicion classes the interrelation region is formed, and when the partial check regions 51a, 51b are to be considered substantially interrelated, are normally firmly preset, but can also depend on the type of the checked bank note BN and/or be based on experience values of previously checked bank notes, which are regularly updated by a central body (e.g. a central server).

Figure 7:
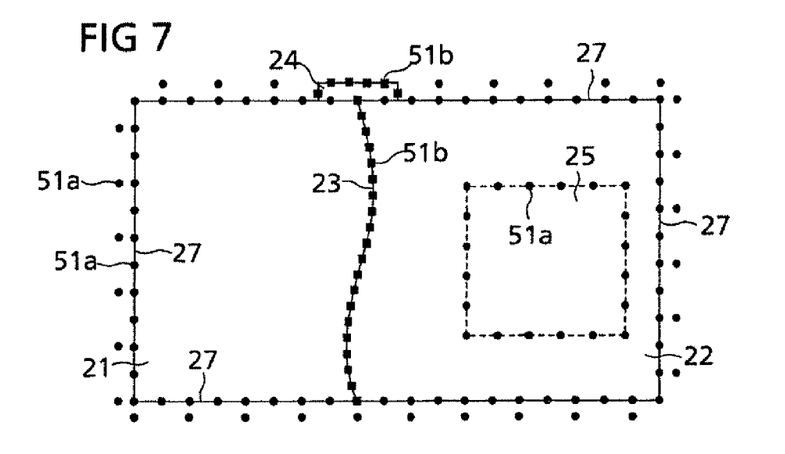
FIG. 7 selected partial check regions according to a special embodiment of the method of FIG. 4.

Likewise, as illustrated in FIG. 7, first, a previously determined reasonable quantity of partial check regions 51a, 51b can be assigned to a suspicion class, so as to start out from this and search for further partial check regions 51a, 51b of the same suspicion class. This may concern e.g. partial check regions 51a, 51b located at the margin of the bank note BN and/or in the region of a security element 25, e.g. enclosing the security element 25. The partial check regions 51a, 51b of FIG. 7 again are preferably formed by individual pixels. In connection with this embodiment it is checked whether from those partial check regions 51b located at the margin of the bank note BN (margin pixels), which have been assigned to a suspicion class indicating a forgery, there can be formed a line-shaped or at least almost line-shaped interrelation region of further partial check regions 51b (pixels) which have also been assigned or are to be assigned to a suspicion class indicating a forgery. In so doing, partial check regions 51b are assigned to suspicion classes and simultaneously an interrelation region is formed, so that in the embodiment in accordance with FIG. 7 the steps S4 and S5 are combined.

In this way, there can be detected step by step and resource-efficiently an interrelation region in the region of a separating line 23 and/or in a region of a protruding adhesive tape 24, and therefrom in step S6 inferred a composed bank note BN. In the method step S6 the bank note BN is finally assigned to an authenticity category, e.g. to the category "authentic", "forgery", "suspicious" or to further authenticity categories differentiating according to forgery probabilities.

The assigning to an authenticity category is effected depending on the form and/or the location of the ascertained interrelation regions. Here, a line-shaped course of an interrelation region of partial check regions 51b indicates a separating line 23 of a forgery (cf. FIGS. 6a, 6b). Likewise, closed line-shaped courses of interrelation regions within the bank note BN can be interpreted as separating lines 23 of a forgery (cf. FIG. 6c), in which e.g. an authentic security element 25 has been inserted into a forged bank note substrate.

In addition, upon the assignment to an authenticity category there can also be taken into account the number of partial check regions 51a, 51b which have been assigned to a suspicion class indicating a forgery. Here, the individual partial check regions 51a, 51b can be weighted to different extents, depending on the forgery probability which is represented by the relevant suspicion class. The criteria for assigning bank note BN to certain authenticity categories, in particular the forms and locations of interrelation regions considered to be a forgery, often depend on the value document and may additionally be subject to a constantly updating learning process and/or be made available to the authenticity recognition device 1 by a central server.

In all the described variants and embodiments of the method according to the invention it is negligible which side of the bank note BN faces in the direction of the measuring device 6. All variants and embodiments allow a reliable recognition of composed bank notes and can be implemented e.g. on personal computers as the evaluation device 11.

The invention claimed is:

1. A method for checking the authenticity of a value document, involving capturing and evaluating electromagnetic radiation passing through the value document, the method comprising the steps:

capturing in locally resolved fashion at least one intensity distribution of electromagnetic radiation in dark field and determining a locally resolved dark field characteristic from the at least one captured intensity distribution;

assigning selected partial check regions of the value document to respectively one of several preset suspicion classes in dependence on a comparison of a characteristic intensity value of the dark field characteristic of the respective partial check region with at least one upper and/or lower threshold value;

forming an interrelation region by aggregating substantially interrelated partial check regions which have been previously assigned to at least one certain suspicion class;

assigning the value document to one of at least two preset authenticity categories linked with the at least one certain suspicion class, in dependence on a form and/or location of the interrelation region, wherein capturing in locally resolved fashion the at least one intensity distribution of electromagnetic radiation in dark field includes measuring electromagnetic radiation scattered by the value document, scattered electromagnetic radiation being electromagnetic radiation that is transmitted through the value document at an angle that is sufficiently different from an angle of transmitted electromagnetic radiation that passes through the value document in substantially a straight line.

2. The method according to claim 1, wherein the at least one intensity distribution is captured in at least one of the infrared region, in the visible spectral region, and the ultraviolet region.

3. The method according to claim 2, wherein, in several spectral regions, one intensity distribution is captured and the locally resolved dark field characteristic is determined from the captured intensity distributions, by mutually corresponding values of the captured intensity distributions of different spectral regions being linked with each other.

4. The method according to claim 1, wherein the selected partial check regions are assigned in dependence on at least one of locally valid upper and lower threshold value, and at least one of globally valid upper and lower threshold value, to respectively one suspicion class.

5. The method according to claim 1, wherein the at least one upper and lower threshold value is specified in at least one of dependence on dark field characteristics of respectively one or several partial reference regions of the value document and dependence on a preset either or both upper and lower standard threshold value.

6. The method according to claim 5, wherein for specifying the at least one upper and lower threshold value characteristic intensity, values of the dark field characteristics of different partial reference regions of the value document are arithmetically linked with each other.

7. The method according to claim 5, wherein the at least one upper and lower threshold value is specified by at least one of an upper and lower standard threshold value of a standard value document being corrected upward, if a characteristic intensity value derived from the dark field characteristics of the partial reference regions lies above a corresponding standard intensity value of the standard value document, or being corrected downward, if the characteristic intensity value derived from the dark field characteristics of the partial reference regions lies below a corresponding standard intensity value of the standard value document.

8. The method according to claim 1, wherein at least one of the suspicion classes is a suspicion class indicating a forgery of the value document, partial check regions of the value document, in which the characteristic intensity value of the respective dark field characteristic lies above an upper threshold value and/or below a lower threshold value, being assigned to the suspicion class indicating a forgery, and of such partial check regions which have been assigned to a suspicion class, indicating a forgery the interrelation region being formed.

9. The method according to claim 1, wherein at least one partial check region at a margin of the value document or at a margin of a security element of the value document is selected and assigned to a suspicion class.

10. The method according to claim 9, including ascertaining at least one of the selected partial check regions, which has been assigned to a suspicion class indicating a forgery, and starting out from this ascertained partial check region, ascertaining at least one partial check region substantially interrelated with the ascertained partial check region, which also is to be assigned to a suspicion class indicating a forgery, from the ascertained, substantially interrelated partial check regions the interrelation region being formed.

11. The method according to claim 1, wherein upon the assignment of the value document to a preset authenticity category, a check is made of whether the interrelation region forms a separating line extending from one side to the same side or whether a separating line extends from one side to a different side of the value document or a separating line circumferentially extends around the margin of a security element of the value document.

12. The method according to claim 1, wherein depending on the number of partial check regions which have been previously assigned to at least one certain suspicion class, assigning the value document to a preset authenticity category which is linked with the at least one certain suspicion class.

13. The method according to claim 1, wherein assigning selected partial check regions of the value document includes dividing the value document into a plurality of partial spatial regions.

14. The method according to claim 1, wherein the formed interrelation region includes at least two partial check regions of the value document that lie sufficiently close together within a predetermined proximity.

15. An apparatus for checking the authenticity of value documents, the apparatus comprising:
a capture device and an evaluation device that capture and evaluate electromagnetic radiation passing through the value document,
the capture device comprising a dark field transmission measuring device which is arranged to capture at least one intensity distribution of the passing electromagnetic radiation in dark field in locally resolved fashion; and
the evaluation device being arranged to determine a locally resolved dark field characteristic from the captured at least one intensity distribution, to assign selected partial check regions of the value document to respectively one of several preset suspicion classes, in dependence on a comparison of a characteristic intensity value of the dark field characteristic of the respective partial check region with at least one upper and/or lower threshold value,
to thereby form an interrelation region by aggregating substantially interrelated partial check regions, which have been previously assigned to at least one certain suspicion class, to at least one interrelation region; and
to assign the value document to one of at least two preset authenticity categories, which is linked with the at least one certain suspicion class, in dependence on at least one of a form and location of the interrelation region,
wherein the dark field transmission measuring device measures electromagnetic radiation scattered by the value document, scattered electromagnetic radiation being electromagnetic radiation that is transmitted through the value document at an angle that is sufficiently different from an angle of transmitted electromagnetic radiation that passes through the value document in substantially a straight line.

16. The apparatus according to claim 15, wherein the apparatus is arranged to carry out a method for checking the authenticity of the value documents, involving a capturing and evaluating electromagnetic radiation passing through the value document, the method comprising the steps:
capturing in locally resolved fashion at least one intensity distribution of electromagnetic radiation in dark field and determining a locally resolved dark field characteristic from the at least one captured intensity distribution;
assigning selected partial check regions of the value document to respectively one of several preset suspicion classes in dependence on a comparison of a characteristic intensity value of the dark field characteristic of the respective partial check region with at least one upper and lower threshold value;

forming an interrelation region by aggregating substantially interrelated partial check regions which have been previously assigned to at least one certain suspicion class;

assigning the value document to one of at least two preset authenticity categories linked with the at least one certain suspicion class, in dependence on a form and/or location of the interrelation region.

17. A processing device for value documents, comprising apparatus for checking the authenticity of value documents as recited in claim 15.

18. A method for checking the authenticity of a value document, the method comprising the steps:

capturing in locally resolved fashion at least one intensity distribution of dark field electromagnetic radiation and determining a locally resolved dark field characteristic from the at least one captured intensity distribution;

assigning selected partial spatial regions of the value document to respectively one of several preset suspicion classes, the assignment of the selected partial spatial regions being dependent on a comparison of a determined characteristic intensity value of the dark field characteristic of the respective partial spatial region with at least one upper and/or at least one lower threshold value;

forming an interrelation region by aggregating substantially interrelated partial spatial regions of the value document which have been previously assigned to at least one certain suspicion class;

assigning the value document to one of at least two preset authenticity categories linked with the at least one certain suspicion class based on a form or location of the interrelation region, wherein capturing in locally resolved fashion the at least one intensity distribution of electromagnetic radiation in dark field includes measuring electromagnetic radiation scattered by the value document, scattered electromagnetic radiation being electromagnetic radiation that is transmitted through the value document at an angle that is sufficiently different from an angle of transmitted electromagnetic radiation that passes through the value document in substantially a straight line.

\* \* \* \* \*